United States Patent [19]

Ramsden

[11] Patent Number: 4,637,289

[45] Date of Patent: Jan. 20, 1987

[54] WORK PRESENCE CONTROLLER

[75] Inventor: Gordon Ramsden, Dallas, Tex.

[73] Assignee: Whirlwind, Inc., Dallas, Tex.

[21] Appl. No.: 667,583

[22] Filed: Nov. 2, 1984

[51] Int. Cl.⁴ ............................................. B26D 5/42
[52] U.S. Cl. ...................................... 83/380; 83/390;
83/397; 83/490; 83/DIG. 1; 83/399
[58] Field of Search .................... 83/63, 66, 67, 360,
83/380, 374, 375, 397, 397.1, 471.2, 477.2, 490,
390, DIG. 1, 399, 400

[56] References Cited

U.S. PATENT DOCUMENTS

| 2,171,541 | 9/1939 | Crouch | 83/370 |
|---|---|---|---|
| 2,821,251 | 1/1958 | Borke | 83/63 |
| 3,199,554 | 8/1965 | Thedick | 83/372 |
| 3,331,408 | 7/1967 | Condit | 30/374 |
| 3,554,067 | 1/1971 | Scutella | 83/397 |
| 3,946,631 | 3/1976 | Malm | 83/397 X |
| 4,033,218 | 7/1977 | Donatelle | 83/478 |
| 4,269,242 | 5/1981 | Smith et al. | 114/192 |
| 4,455,904 | 6/1984 | Havner et al. | 83/917 X |

FOREIGN PATENT DOCUMENTS 3116292 11/1982 France ............................... 83/397.1

Primary Examiner—James M. Meister
Assistant Examiner—John L. Knoble
Attorney, Agent, or Firm—Richards, Harris, Medlock & Andrews

[57] ABSTRACT

A saw wherein an arbor is mounted to drive a circular saw blade from below a flat work surface upward through a slot in the work surface to sever any work piece suitably disposed on the work surface. A guard/clamp above the work surface is lowered to engage and clamp each such work piece on the work surface before the saw blade begins its ascent. A sensor is mounted on the guard/clamp to sense the presence of a work piece at a location immediately on the work piece feed side of the saw blade and adjacent a saw fence. The sensor prevents operation of the saw when the sensor fails to establish the presence of a work piece on the work surface.

12 Claims, 4 Drawing Figures

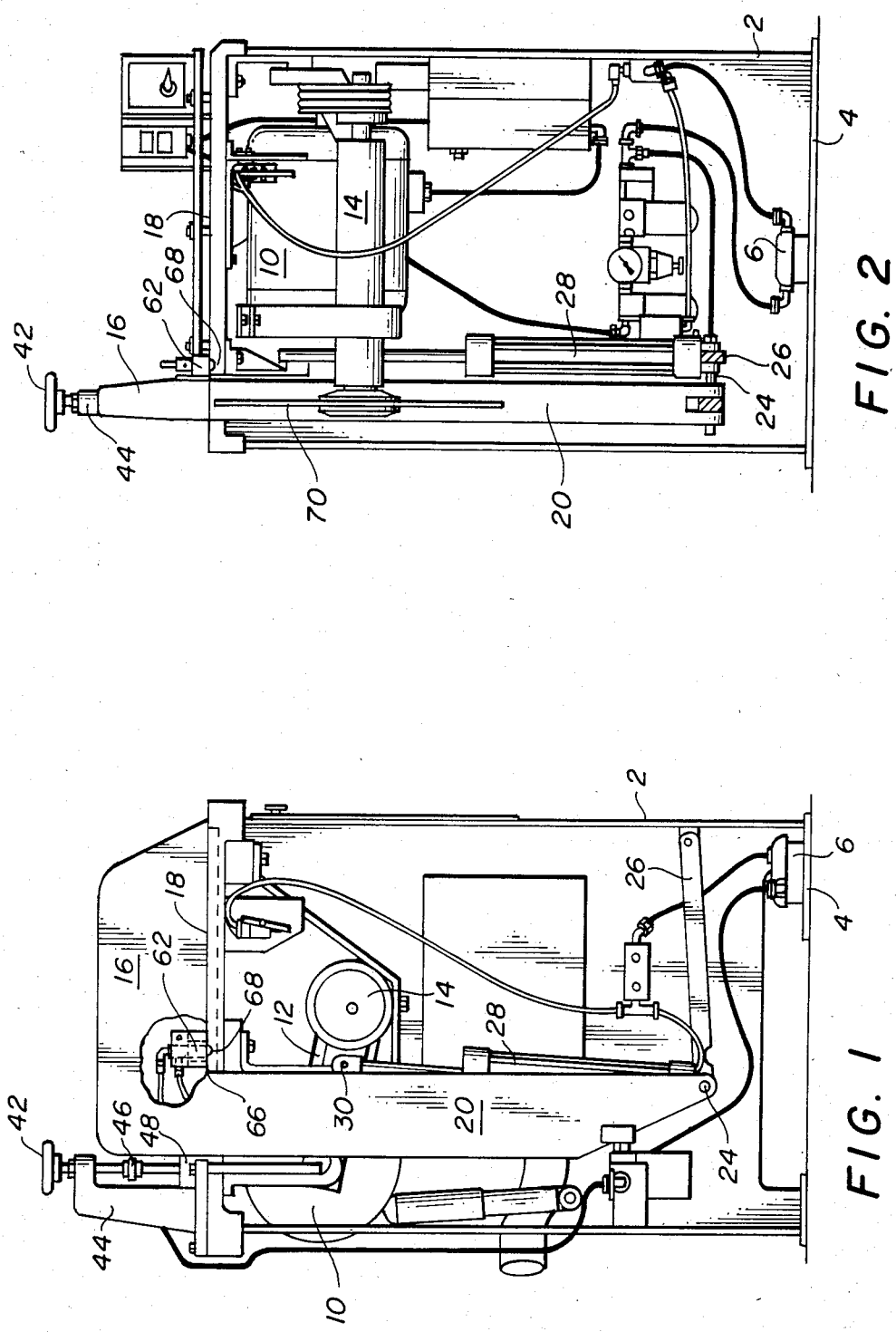

WORK PRESENCE CONTROLLER

TECHNICAL FIELD

This invention pertains to material working machines which provide enhanced safety. In particular, it involves a power saw system with a work piece sensor mounted on a guard/clamp so as to prevent the activation of the saw unless the presence of a work piece is sensed when a cutting cycle is initiated.

BACKGROUND OF THE INVENTION

Prior hereto, Whirlwind, Inc. has manufactured and sold woodworking saws known as Whirlwind Saws. The saws have a guard/clamp located above a motor driven circular blade, which in turn is mounted beneath a bench top. The guard/clamp is an elongated inverted trough structure with a long vertical stem. It is mounted in registration with and in superimposed position over the saw blade and the slot in the bench top through which the saw blade is to be elevated. The guard/clamp is mounted above the bench top and is provided with the means to move downward toward the bench top to press downward and hold a work piece which is to be cut.

SUMMARY OF THE INVENTION

This invention relates to enhancing safety in the operation of semi-automatic woodworking bench type power saws. In such saws, the saw blade is mounted beneath both the bench top and the guard/clamp. When the guard/clamp is lowered it clamps the work piece by forcing it down onto the table top. Raising the saw blade cuts the work piece. A sensor is mounted on the guard/clamp at a location adjacent to the path of the saw blade to permit actuation if a work piece is detected at a predetermined location.

If the cutting cycle is arrested, the system returns to a rest position with the saw blade beneath the table top and the guard/clamp carrying the sensor elevated above the work piece. The work piece substantially shields any slot opening under the guard/clamp leading to the saw slot. If no work piece is present, the sensor above the path of the work piece will not be touched, the saw will not be actuated, and the saw blade will remain in or return to its reset position beneath the bench top.

The sensor mounted on the guard/clamp extends only slightly below the bottom edge of the guard/clamp preferably, at a point slightly on the work piece feed side of the saw blade and adjacent to the rear fence. Typically, the guard/clamp is set to a height of approximately $\frac{1}{8}''$ to $\frac{1}{4}''$ greater than the thickness of the work piece when awaiting insertion of the work piece. Only if the sensor contacts the work piece and the controlling foot pedal is depressed will the operation go forward.

In the absence of sensor contact, the cutting cycle is not initiated even though the foot pedal is depressed. When the foot pedal is released during a cutting cycle, the cycle will be aborted. The guard/clamp is adjustable to a preset height above the bench top so that a succession of work pieces of the same thickness will be admitted under the guard with minimal clearance and will contact the sensor. Each successive piece will come into contact with the sensor because the guard/clamp, in the raised position after the previous cutting cycle, is set to clear boards which are to be worked as a batch. If the foot pedal is released, the saw will return to its rest condition and the guard/clamp will release the work piece. In models of the Whirlwind Saw heretofore sold and widely used, the work piece may be two inches by twelve inches or four inch stock.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a view of a left-hand saw embodying the invention wherein cover portions have been removed to permit view of the inside of the saw, and the guard/clamp has been cut away to permit view of the sensor switch;

FIG. 2 is a view of the front of the left-hand saw of FIG. 1 with the front plate portion of the housing removed for viewing the construction;

DETAILED DESCRIPTION

Figure 3:
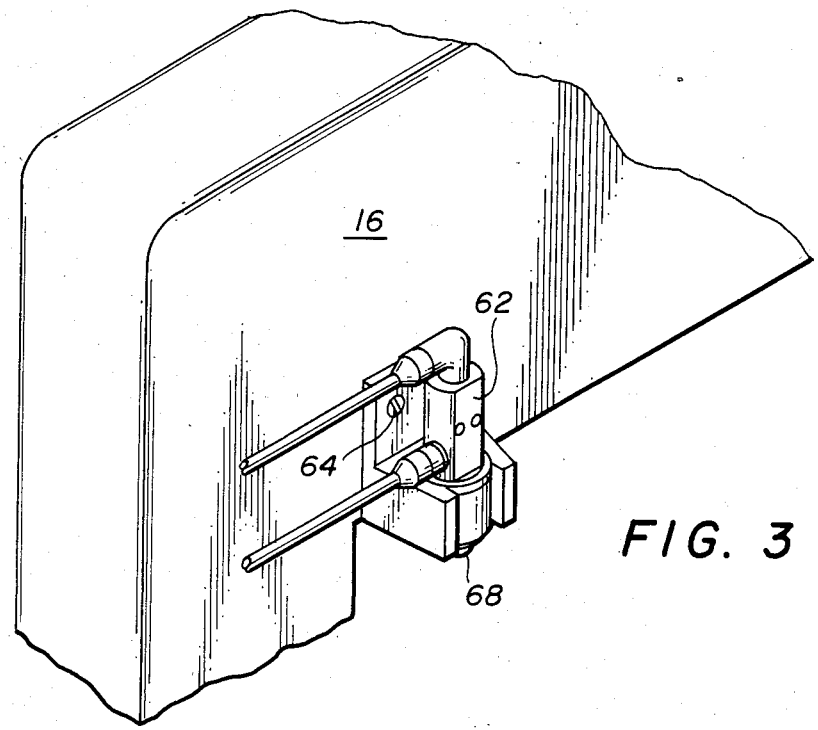
FIG. 3 illustrates a pneumatic sensor applied to a right-hand saw.

Referring now to FIGS. 1 and 2, a left-hand saw in which the present invention is employed is illustrated in FIG. 1 as if the left hand portion of the base cover had been removed. It will be understood that a right-hand saw will have the same elements and operation. A base 2 extends from a floor plate 4 on which there is mounted a foot pedal 6. The base supports a guard/clamp 16. A motor 10 is suitably mounted for support by the base 2. Motor 10 is connected by way of belts 12 to a saw arbor 14. The inverted L-shaped guard/clamp 16 is mounted to permit it to be lowered to come to rest on a work bench surface 18. A vertical stem 20 of guard/clamp 16 extends downward through a slot in work surface 18. The lower end of guard/clamp 16 is connected at a pin 24 to an anchor bracket 26 and to the lower end of a pneumatic cylinder 28. The upper end of pneumatic cylinder 28 is connected at a yoke 30.

Mounted on top of work bench surface 18 and to the back portion thereof is a height adjustment mechanism. It includes a knob 42 which serves a rod that extends through a threaded opening in the top of the guide bracket 44 and controls the height of collar 46. Guard/clamp 16 has lug 48 extending towards guide bracket 44 which engages with collar 46 to limit the guard/clamp's upward movement. As shown in FIG. 1, the guard/clamp 16 is in a rest position such that it rests upon the bench work surface 18.

Arbor 14 will be raised after guard/clamp 16 descends to contact with any work piece. The saw blade 70 then is raised and passes through a slot in work bench surface 18. Any materials clamped in position to be over work surface 18 will be severed. The saw, completing its cut, is then retracted back into the housing below the work surface and the guard/clamp 16 is then released and raised slightly so that the material clamped on work bench surface 18 during the cutting operation may be removed and succeeding cutting cycles carried out.

Such saws as above described are well known and are involved in saws heretofore manufactured and sold by Whirlwind, Inc., in both the left-hand and right-hand varieties.

It has been the experience of a few of those working with prior saws as herein described to suffer severed fingers on several occasions. Prior systems would operate through a complete cycle when foot pedal 6 actuated the system. The present invention involves the use of controls on such a saw as illustrated in FIGS. 1 and 2 which will drastically reduce or eliminate thd incidence of accidents in using the saw.

The first step in operating the saw is to adjust the height of guard/clamp 16 to a level $\frac{1}{8}$ to $\frac{1}{4}$ of an inch higher than the upper surface of a board that is to be cut by the saw. Such initial adjustment of the height is made by rotating knob 42 to raise guard/clamp 16 to a rest position such that the lower edge of guard/clamp 16 is spaced above work surface 18 by the thickness of the board to be cut, plus $\frac{1}{8}$ to $\frac{1}{4}$ inch.

Referring now to FIG. 3 in accordance with one embodiment of the present invention, the sensor is a pneumatic valve 62 mounted by screws 64 to the work piece feed side of guard/clamp 16. In the preferred embodiment of the invention, valve unit 62 is mounted on the work piece feed side of guard/clamp 16 near the corner 66 of guard/clamp 16. In an alternative embodiment, valve unit 62 is mounted on the work piece removal side of guard/clamp unit 16. It will be noted in FIG. 3 that valve 62 has an upper flattened portion through which the screws 64 pass to secure valve 62 to the side of guard/clamp 16. A spring loaded sphere 68 is mounted in the bottom of valve 62 and is at a rest position preparatory to cutting a given board. Sphere 68 is moved upward in valve unit 62 by reason of contact with a work piece positioned to be cut by one cycle of the saw. The construction of this embodiment involves the necessity for adjustment of knob 42 to raise or lower an adjustment nut 46 initially to position guard/clamp 16 to minimize the size of any opening through which the operator might pass his hands as the saw undertakes a cutting cycle. The actuation of valve 62 is one in which the flow of air through the lines leading to and from valve 62 serves to cause any cutting cycle to be aborted. The system will not permit the execution of a cycle unless the valve 62 is brought in contact with the top surface of the board to be cut.

The saw is a semi-automatic cutoff saw using pneumatic cylinder 28 and a series of valves to operate each cycle. Incoming air is first cleaned and dried in a filter which is regulated by line pressure. When air pressure is on the saw and the saw is idle, the cylinder is closed, guard/clamp 16 is up and the blade 70 is down. When foot pedal 6 is depressed and held down, air passes to a cutoff valve which allows the air to pass through initially but then closes to prevent further air flow. It will remain closed so long as foot pedal 6 is held down, or until pressure is exhausted and the saw returns to rest position. In such condition, guard/clamp 16 is up and saw blade 70 is down any time foot pedal 6 is released. Air from the cutoff valve goes to further pneumatic valves in the system, as can be ascertained from saws in current operation.

Cylinder 28 will be extended until the arbor 14 trips a roller valve which exhausts the air from the cutoff valve to the pilot valve.

Figure 4:
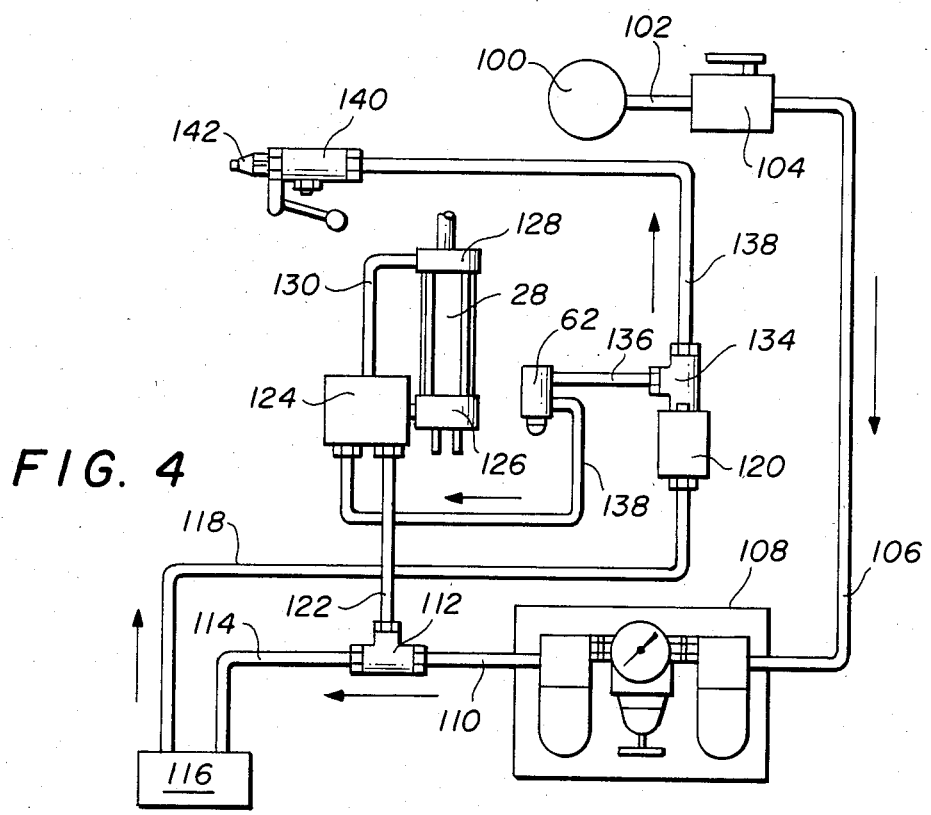
FIG. 4 is a line diagram of the pneumatic elements driving cylinder 28 in one aspect of the invention.

FIG. 4 shows an air supply unit 100 supplied by way of tube 102 to a manual cutoff valve 104. The downstream side of valve 104 is connected by way of tube 106 to a filter regulator lubricator assembly 108. The output of unit 108 is connected by way of pipe 110 and the T-unit 112 to line 114 which leads to the foot valve 116. The output of foot valve 116 is applied by way of line 118 to a cutoff valve 120. Line 122 also leads from T-unit 112 and extends to the air pilot valve 124. Air pilot valve 124 is connected to cylinder 28 at the lower end 126 thereof and is connected to the upper end 128 by way of tube 130. Air flow from foot valve 116 is supplied by way of pipe 118 to cutout valve 120. Line 106 includes a T-unit 134 immediately above the cutout valve 120. T-unit 134 is connected by way of pipe 136 to safety valve 62, the output of which is supplied by way of line 138 to an input of the air pilot valve 124. T-unit 134 is connected by way of line 138 to a roller valve 140 and muffler 142.

Pilot valve position 124 shifts and exhausts air from the bottom of the cylinder 28 and also applies regulated pressure to the top of the cylinder 28. Thus saw blade 70 moves down and guard/clamp 16 moves up.

The valves are regulated from line pressure to 90 psi and lubricated by oiler 108. Regulated pressure is taken to two locations, foot valve 116 and pilot valve 124, which is the inlet of the cylinder 28.

With air pressure on and the saw "idle," cylinder 28 is closed. The guard is up and blade is down. When foot valve 116 is depressed and held down (open) air passes to the cutout valve 120 which allows the air to pass through initially, then it closes preventing further air flow. It will remain closed as long as foot valve 116 is held down, which places pressure on inlet port, or until outlet pressure is exhausted. The saw will return to "idle," wherein guard/clamp 16 is up and saw blade 70 is down, any time the foot valve 116 is released. Air from the cutout valve 120 goes to two valves, the roller valve 140 and the pilot valve located on cylinder 28.

Pilot valve 124 does two things. First, it directs fhe regulated air pressure to either end of cylinder 28 depending on its position. Second, it exhausts the opposite end of the cylinder. The speed of the cylinder's operation is determined by the rate of exhaust flow which is adjusted by a separate bleeder valve for each direction. These two bleeder valves (not shown) are located in the pilot valve housing. Air pressure from the cutout valve 120 pushes the pilot valve piston 124 upward, which allows regulated air to flow to the bottom of the cylinder 28. It also allows the upper end of cylinder 28 to exhaust as the cylinder begins to extend. Guard/clamp 16 then moves down, and saw blade 70 moves up. The duration of this half cycle is adjusted by the upper bleeder valve.

Cylinder 28 will extend until the arbor 14 trips the roller valve 140 which exhausts the air from the cutout valve 120 to the pilot valve. The pilot valve piston shifts and exhausts the air on the bottom of the cylinder 28. It also directs regulated pressure to the top of cylinder 28. Saw blade 70 moves down, and guard/clamp 16 moves up.

In one embodiment of the invention, the valve 62 is of the type manufactured and sold by Air-Dreco, Inc., P. O. Box 35652, Dallas, Tex. 75235. It will be understood that the sensor of the present invention can also be an electrical sensor, a heat sensor, or an optical sensor.

Having described the invention in connection with certain specific embodiments thereof, it is to be understood that further modifications may now suggest themselves to those skilled in the art, and it is intended to that this disclosure cover such modifications as fall within the scope of the appended claims.

What is claimed is:

1. In a saw having a frame where an arbor is mounted to drive a circular saw blade from below a flat work surface upward through a slot therein to sever any work piece suitably disposed on said work surface and wherein a guard/clamp above said surface is lowered to engage and clamp each such work piece on said work surface before said saw blade begins its ascent, the guard/clamp having a vertical stem extending through the work surface below the surface, an anchor bracket pivotally connected between the frame and the vertical stem to guide the guard/clamp for vertical movement relative to the work surface, the combination which comprises:

a foot pedal mounted at the base of the saw for initiating and terminating a cutting cycle of the saw;

a single, double-action pneumatic cylinder connected to said guard/clamp and said arbor which lowers said guard/clamp guided by the vertical stem and anchor bracket and then raises said saw blade at initiation of said cutting cycle and which lowers said saw blade and then raises said guard/clamp at termination of said cutting cycle;

a sensor mounted on said guard/clamp to sense the presence of a work piece on said work surface; and means responsive to said sensor to prevent initiation of said cutting cycle when said sensor fails to establish the presence of said work piece on said work surface.

2. The saw of claim 1 wherein said sensor is a pneumatic valve.

3. The saw of claim 1 wherein said sensor is an electric switch.

4. The saw of claim 1 wherein said sensor is an infrared radiation detector.

5. The saw of claim 1 wherein said sensor is an optical detector.

6. The saw of claim 1 wherein said sensor has means to detect the presence of a work piece beneath said guard/clamp.

7. The saw of claim 6 wherein said detection means comprises a feeler arm extending below the lower margin of said guard/clamp.

8. The saw of claim 1 wherein said means responsive to said sensor is pneumatic.

9. The saw of claim 1 wherein said means responsive to said sensor is electric.

10. The saw of claim 1 wherein said guard/clamp has a work piece feed side and a work piece removal side and said sensor is mounted on the said work piece feed side of said guard/clamp.

11. The saw of claim 1 wherein said guard/clamp has a work piece feed side and a work piece removal side and said sensor is mounted on said work piece removal side of said guard/clamp.

12. In a cut off saw the combination comprising:
    (a) a rotary saw blade mounted on an arbor below the top of a work bench surface and driven by an electric motor, the work bench having a frame;
    (b) a guard/clamp for clamping said work piece to said work surface and covering exposed portions of said rotary saw blade when engaged with said work piece, said guard/clamp having a vertical stem extending through the work surface below the work surface, an anchor bracket pivotally connected between the frame and the vertical stem to guide the guard/clamp in raising and lowering motion;
    (c) a pressure sensor mounted on said guard/clamp and extending below the lower margin of said guard/clamp;
    (d) a means to lower said guard/clamp to a height greater than, but substantially equal to the thickness of the work piece;
    (e) a foot pedal mounted at the base of the saw for initiating and terminating a cutting cycle of the saw;
    (f) a single, double-action pneumatic cylinder connected to said guard/clamp at the vertical stem and said arbor which lowers said guard/clamp and then raises said saw blade at initiation of said cutting cycle and which lowers said saw blade and then raises said guard/clamp at termination of said cutting cycle; and
    (g) means connected to said sensor to render inoperable said pneumatic cylinder unless said sensor is in contact with said work piece.

* * * * *